United States Patent [19]

Macpherson et al.

[11] 4,255,375

[45] Mar. 10, 1981

[54] PROCESS FOR THE PREPARATION OF DUSTLESS, READILY-DISPERSIBLE PIGMENT OR DYESTUFF GRANULES

[75] Inventors: Ian A. Macpherson, Paisley; John A. Stirling, Glasgow; Ian R. Wheeler, Houston; James M. McCrae, Stewarton, all of Scotland

[73] Assignee: Ciba-Geigy Corporation, Ardsley, N.Y.

[21] Appl. No.: 43,592

[22] Filed: May 29, 1979

[30] Foreign Application Priority Data

May 31, 1978 [GB] United Kingdom ............... 25501/78

[51] Int. Cl.³ ..................... C08L 91/00; C09B 67/08
[52] U.S. Cl. ................................... 264/117; 106/262; 106/308 F; 260/23 R
[58] Field of Search ............ 106/206, 262, 266, 308 F, 106/309; 264/117; 260/23 R

[56] References Cited

U.S. PATENT DOCUMENTS

| 2,268,144 | 12/1941 | Vesce .................................. 106/262 |
| 4,015,999 | 4/1977 | Robertson et al. ............... 106/288 Q |
| 4,170,487 | 10/1979 | Robertson ........................ 106/308 F |

FOREIGN PATENT DOCUMENTS 429553  5/1935  United Kingdom ................ 106/308 F

*Primary Examiner*—Theodore Morris
*Attorney, Agent, or Firm*—Harry Falber

[57] ABSTRACT

A process for producing a pigment or dyestuff composition in the form of dustless readily dispersible granules, which process comprises contacting, with agitation, an aqueous dispersion of a pigment and a composition comprising one or more organic acids which are liquid at temperatures below 100° C. or their salts, at a pH value at which the acid is insoluble in water, the temperature being maintained during contacting above the melting point of the acid until the pigment has completely transferred into the organic phase; increasing the pH to a value suitable to render the acid soluble in water and recovering the resulting granules.

10 Claims, No Drawings

PROCESS FOR THE PREPARATION OF DUSTLESS, READILY-DISPERSIBLE PIGMENT OR DYESTUFF GRANULES

The present invention relates to a process for the preparation of dustless, readily-dispersible pigment or dyestuff granules.

The preparation of pigment granules by a process which comprises stirring together an aqueous pigment and a solution of a water-insoluble organic carrier in a water-immiscible organic liquid is known. However, in the known processes the resulting product contains some solvent, and it is necessary to remove the organic solvent from the product by distillation.

We have now discovered a process in which such disadvantages are overcome.

According to the present invention, there is provided a process for producing a pigment or dyestuff composition, in the form of dustless readily dispersible granules, which process comprises contacting, with agitation, an aqueous dispersion of a pigment and a composition comprising one or more organic acids which are liquid are temperatures below 100° C. or their salts, at a pH value at which the acid is insoluble in water, the temperature being maintained during contacting above the melting point of the acid until the pigment has completely transferred into the organic phase; increasing the pH to a value suitable to render the acid soluble in water and recovering the resulting granules.

In the case where the acid or acids are used as salt derivatives, initial contact with the pigment dispersion is made at a pH whereat the salt is soluble in water. The pH is lowered to a value at or below that at which the acid is insoluble in water and the process is continued until the pigment has completely transferred to the organic phase.

The organic acids may be carboxylic, sulphonic or phosphonic or mixtures thereof.

The above mentioned acids may be aliphatic acids such as $C_5$-$C_{18}$ linear, branched or substituted, saturated or unsaturated alkyl or cycloalkyl acids and the alkyl residue may or may not be interrupted by other atoms such as e.g. oxygen, nitrogen, sulphur or a functional group such as e.g. a carbonyl or sulphonyl group. Alternatively, the acids may be aromatic or substituted aromatic compounds e.g. an alkylated benzoic acid or a phenyl substituted aliphatic acid. Alternatively, the organic acid used may contain more than one acid residue and, in these cases, the compounds used may be esters or derivatives of the organic acid, while still retaining at least one acid function e.g. monomethyl esters of adipic acid or sebacic acid.

The preferred acids are those which are free of, or substantially free of, any undesirable properties such as for example surfactant properties, which could cause difficulties on isolation.

The especially preferred aliphatic acids are the $C_6$-$C_{10}$ straight and branched chain carboxylic acids, such as, for example, octanoic acid or 2-ethyl hexanoic acid.

The salts of these acids include both metal and non-metal salts, the preferred salts being the alkali metal salts and the ammonium salts.

The amount of acid or its salt used depends upon the pigment employed but is preferably from 0.1 to 4 parts, and preferably 0.5 to 1.5 parts by weight per part of pigment. Larger proportions of acid in general give larger granules.

In order to reduce the amount of aliphatic acid used in the present process, the acid (as its salt) is dissolved as before but then, rather than removing the acid from the reaction mixture, we re-acidify the latter and allow that proportion of pigment which did not flush (transfer into the organic phase) initially, so to flush. This sequential procedure may be repeated, if desired, within a single process run until all suspended pigment has been converted into bead form, which may then be isolated as before.

The process may also be carried out in the presence of an organic carrier. The organic carrier may be any organic compound which is soluble in, or at least softened by, the acid compound and which is insoluble or can be rendered insoluble in water at the final pH value used in the process. The carrier can be a liquid if the ratio of pigment to carrier is high, for example at or above 90:10; at lower proportions of pigment, e.g. 50%, it is preferably to have a compound having a melting point above 40° C. as carrier.

It is an advantage of the present invention over the above mentioned prior art that certain pigment carriers which are acid soluble but insoluble in alkali may be used. As examples of such carriers there may be mentioned those described in our British Pat. No. 1,486,117.

Other suitable carriers include, for example, carboxylic acid esters derived from alkyl, aryl, aralkyl or cycloalkyl carboxylic acid or polyacids; and alkyl, aryl, aralkyl, or cycloalkyl mono- or polyhydroxy compounds, such as the fatty acid esters, cetyl palmitate, glycerol tristearate, glycerol monostearate, glycerol tripalmitate, glycerol trioleate, ethylene glycol dilaurate, ethylene glycol distearate, diethylene glycol distearate, or the benzoic acid esters, such as ethylene glycol dibenzoate, neopentyl glycol dibenzoate, trimethylol ethane tribenzoate, trimethylol propane tribenzoate or the dicarboxylic acid esters, such as dibenzyl phthalate, dibutyl phthalate, dioctyl phthalate, dicyclohexyl phthalate, and similar esters of adipic, sebacic or azelaic acids; amides from the above carboxylic acids and ammonia, or alkyl aryl, aralkyl or cycloalkyl mono- or poly-amines, such as stearamide, oleamide, palmitamide, N-alkyl stearamides or oleamides, ethylene bis stearamide; phosphate esters such as triphenyl or tricresyl phosphate, resins such as hydrocarbon resins, xylene-formaldehyde resins, coumarone, coumarone-indene and ketone resins; vinyl polymers, such as polyvinyl chloride and vinyl chloride copolymers, acrylate and methacrylate polymers and copolymers, polyvinyl acetate and vinyl acetate copolymers; styrene homo- and copolymers; polyolefines such as polyethylene, polypropylene and polyisobutylene; fatty alcohols which are water insoluble, such as cetyl alcohol and stearyl alcohol.

The weight ratio of pigment or dyestuff to carrier may be from 50:50 to 100:0, preferably from 90:10 to 100:0.

When the process is carried out in the presence of an organic carrier the amount of acid compound used is that which will form a solution of or at least soften the carrier. When using high ratios of pigment to carrier or when using a carrier which is poorly soluble in the acid compound, or when no carrier is used, higher proportions of the acid compound may be needed to form satisfactory granules.

The pigments and dyestuffs that can be used are those which are water insoluble and stable in the pH range required for granule formatation and isolation. Suitable pigments are azo, azomethine, anthraquinone, phthalocyanine, nitro, perinone, perylene, dioxazine, thioindigo, isoindolinone, quinacridone, azo or azomethine metal salts or complexes, mixtures of pigments may also be used. Examples of water insoluble dyestuffs are the solvent soluble azo and phthalocyanine dyes. These dyes can also be used as mutual mixtures or in admixture with the pigment.

The organic carrier may be added with the acid compound, either dissolved or dispersed in the acid, or both may be added prior to any heating or at any point during a heating cycle. The carrier may also be added in the form of an aqueous dispersion, for example, an aqueous dispersion of a polymer or resin such as polyvinyl chloride, vinyl chloride copolymer or low molecular weight (oxidised) polyethylene.

As well as using pure pigments or dyestuffs, ready-for-use-pigment preparations may be used i.e. preparations which contain, in addition to the pigment, for example 5 to 90 percent, preferably from 10 to 40 percent by weight of additive.

A protective colloid may be added to the mixture to assist in the formation of granules and the production of granules of a more uniform size distribution. When used, it is preferably mixed with an aqueous pigment slurry or an aqueous dispersion of the acid compound before the pigment and acid compound are brought together. Suitable protective colloids include cellulose derivatives such as hydroxy ethyl cellulose and hydroxy propyl cellulose, polyvinyl alcohol, polyethylene oxide, polypropylene oxide, copolymers of ethylene oxide and propylene oxide, adducts of ethylene oxide or propylene oxide, polyvinyl pyrrolidone and its copolymers or mixtures of these compounds. The preferred compounds are those of the hydroxy ethyl cellulose type as exemplified by the Natrosol range of the Hercules Powder Company.

The amount of protective colloid may be up to 15 percent, but is preferably less than or equal to 5 percent by weight of the pigment.

The process may be carried out at any pre-selected temperature, at which the carrier is at least softened, but preferably dissolved in the acid at the temperature used.

The mixture is originally formulated at, or adjusted to, a pH of at least that at which the acid compound is insoluble in water. A slow rate of pigment migration into the acid droplets may be accelerated by increasing the temperature. The mixture is stirred at least until the pigment has migrated from the aqueous phase to the organic phase. Sufficient stirring is used to keep the droplets (or granules) in suspension. The size of granule is controlled to some extent by the speed of stirring. Increased stirring or turbulence gives a reduction in granule size. Granule size may also be reduced by increasing the level of protective colloid, though in general this is not a very sensitive variable. High turbulence, and therefore small granules, can be obtained by use of the modified mixer/emeulsifier outlined in our copending British patent application No. 48061/77. The granules may be from 0.1 to 3 mm in diameter, but are preferably from 0.2 to 2 mm in diameter.

Alternatively, the process can be carried out in the absence of such additives as hereinabove described.

The pigment starting material may be in the form of a dry powder, presscake or aqueous slurry for the initial contacting with the acid compound.

The pigment in the form of dry powder, presscake or aqueous slurry, may be contacted with the organic acid, optionally with a carrier and in the presence of a protective colloid before, during or after a heating stage. For example, organic acid, optionally containing a carrier dissolved therein, may be added to a stirring aqueous pigment dispersion or freshly coupled aqueous pigment slurry, containing protective colloid. Alternatively, pigment in the form of dry powder or aqueous slurry may be added to a stirring mixture of acid and water. A protective colloid may be present in the pigment slurry, the aqueous acid mixture or both.

As a further alternative in any of the above processes, the salt of the acid may be used to contact the pigment dispersion. Then, by adjusting the pH, the free acid which is insoluble in water at this pH may be liberated and the process is continued as herein described.

If the pigment is added in the form of an aqueous slurry, this may be obtained from redispersed powder or presscake but is preferably obtained by conventional pigment preparation: the amount of pigment in the slurry is usually from 1 to 15% by weight based on the weight of water. When slurries are used, the conditions of contacting are arranged to ensure substantial insolubility of the acid by controlling pH and temperature; lower pH values ensure the presence of the acid in its free form, the higher pH ensuring the water solubility of the acid. The contacting may be carried out under different conditions of stirring and shear.

Irrespective of the method employed in contacting pigment and acid, after the contacting with the acid has been completed and the granules have formed under the action of continuous stirring the pH is adjusted to solubilise all or substantially all the acid used to form the granules. The pigment granules are then isolated in acid-free or substantially acid-free condition, for example by filtration and washing; washing should ensure the desired degree of acid removal, with addition of alkali to washwater if necessary, and the final wash usually ensures the pigment is substantially salt free and neutral; any drying necessary is usually by standard techniques.

As hereinbefore described, the acid used may be a composition of organic acids, one or more of which may be retained in the final pigment granule depending on he pH used to complete granule formation. These retained acids or their salts may impart properties advantageous to the pigment granules in the applications in which they are finally used.

Preferably, however, alkali is added to the slurry to solubilise the acid as its salt, and the acid free or substantially acid free pigment granules are recovered by filtration and washing as before.

The time and temperature of either above processes can be varied depending on the pigment used and the desired properties of the poduct. For example some pigments, particularly azo pigments, are susceptible to crystal growth when in contact with the acid compound, the amount of growth being dependent on the temperature of contact and to a lesser extent, on the time. Increased crystal size can give a pigment having higher opacity, increased lightfastness and weatherfastness and improved rheology. Therefore, in these cases, and if a product with good opacity and improved rheology and fastness in the application system is required, the temperature and time of contact of the pigment with the acid compound can be increased. It is a particular advantage of this process that the stirring mixture of pigment acid compound, water, and carrier and stabilising colloid, if present, may be subjected to pressure treatment at temperatures in excess of 100° C. to achieve the desired degree of opacity, prior to cooling to a temperature below 100° C. and forming granules by pH adjustment as hereinbefore described. Diazo pigments intended for paint applications benefit particularly from such treatment. If, on the other hand, a pigment susceptible to crystal growth is used, but a product having good transparency is required, the temperature may be lowered, and the process time can be shortened to that which is sufficient for the piment to migrate into the organic phase. In these cases the addition of a carrier may assist robust granule formation, thereby further shortening the process time. Selection of the acid can also affect the opacity/transparency of the granule produced.

A special feature of this process is that the time of contacting can be accurately controlled by the appropriate adjustment of pH to remove the active organic acid, thus arresting change at a specific point.

It is a further special feature of this process that the isolation of the organic acid can be so controlled that those alkali soluble additives known to impart advantageous applicational properties are retained in the final product e.g. Staybelite Resin ("Staybelite" is a registered Trade Mark.)

A further special feature of this process is that isolation of the organic acid by this method will also effect removal of undesirable alkali soluble impurities in the pigments used, for example excess coupling component present in the product of azo couplings. With those pigments which show little or no tendency to crystal growth in the process, there is no benefit from increased time of contact of the pigment with the acid compound beyond that required to form granules. Granule formation in such instances is substantially assisted by the use of additive as hereinabove described. In these cases, granule formation is further assisted by the use of inorganic salts dissolved in the water during the contacting process. Especially typical of such pigments are those which have been treated with crystallising solvent during a previous process stage, e.g. halogenated copper phthalocyanine (green).

The pH of the mixture is then increased to above that at which the acid compound becomes completely soluble in water; this pH value is usually above 6. The pH increase is effected by the addition of a base which will form a water soluble salt with the acid compound. The preferred bases are the alkali metal hyroxides and carbonates e.g. of sodium. This causes the acid compound to dissolve in the water as a salt, leaving the additive-pigment granules in suspension. If necessary, e.g. to promote solution of the acid as its salt or if desired for handling or product performance, the temperature of the mixture may be increased or decreased. The granules are then recovered by sieving, washing and drying. Any granules that are too small to be recovered in this way may be recovered from the filtrate and re-used in a subsequent batch.

To recover the acid, the pH of the filtrate is lowered, usually to a pH below 7, typically 3, for example by addition of mineral acid, whereupon the acid becomes insoluble, separates from the water and can be recovered for subsequent use e.g. by decantation.

It is also possible to combine the granulation process of the present invention with a pigment solvent treatment process, to improve those pigment properties known to be improved by a solvent treatment. The solvent treatment can be carried out before or during the granulation step. For example, a phthalocyanine in a highly aggregated state of an $\alpha/\beta$ crystal form mixture, as produced by dry grinding, may be de-aggregated and converted substantially to the $\beta$-form, using the acid compound as the solvent in a solvent treatment process.

The granules, especially those of about 1 millimeter diameter can be improved in free flowing nature initially, and during storage, by the addition of a small percentage, for instance up to 2% by weight, of a finely divided inorganic or modified inorganic material conventionally used for imparting such properties, such as a finely divided silica or silicate; such materials may conveniently be added to the granules by simple mixing. Especially advantageous materials of this type, are the finely divided silicas with surface modifications by organic groups such as the Aerosil R 972 (ex. Dugessa).

The process of the present invention provides easy control of pigment properties, and a simple method of separating solvents and recovering the pigment granules. The acid compound isolated as its soluble salts in the filtrate, may readily be recovered by acid addition to the filtrate. The process can improve such properties as gloss, cleanliness, rheology, opacity and fastness to weather and light. The fastness and opacity properties are particularly desirable for deep shade paint films where exterior weather fastness is required.

The following Examples further illustrate the present invention. Parts and percentages are by weight, unless otherwise stated. Parts by volume bear same relationship to parts by weight as do kilograms to liters.

EXAMPLE 1

A freshly coupled slurry, containing 10 parts of C.I. pigment Yellow 17, was dispersed with agitation in sufficient water to dilute the volume to 400 parts. 0.1 parts hydroxy ethyl cellulose (Natrosol 250HR; Hercules Powder Co. Ltd.) were added and the temperature raised to 40° C. With continuous stirring, 10 parts by volume of octanoic acid were run in evenly over 15 minutes. After 30 minutes, when the pigment had migrated into the droplets of octanoic acid, 20 parts of 20% aqueous sodium hydroxide solution were added over 5 minutes. After a further 5 minutes, stirring was stopped and the granular product isolated on a 60 mesh sieve, washed salt free and to neutral pH with water, and dried at 50° C. There were obtained 9.37 parts of essentially spherical granules with 0.42 parts of fine material (fines) recovered from the filtrate.

When assessed in a long oil alkyd decorative paint, the product of this example was of similar strength but cleaner and greener than a similar paint prepared from C.I Pigment Yellow 17 powder.

EXAMPLE 2

0.10 parts hydroxy ethyl cellulose (Natrosol 250HR) were dispersed in 1250 parts water containing 15 parts glacial acetic acid, by a high energy mixer/emulsifier. 14.25 parts of C.I. Pigment Yellow 1 were added and stirring continued until a dispersion was obtained. The slurry was heated to 65° C. and a solution of 0.75 parts of the compound of formula

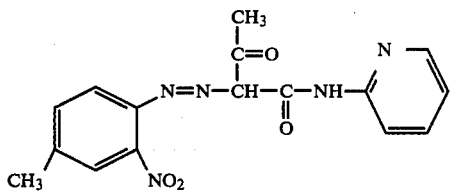

(the preparation of which is described in British Pat. No. 1,486,117), dissolved in 30 parts of hot glacial acetic acid added. After stirring for a further 40 minutes the mixer/emulsifier was replaced by a propeller agitator and 13 parts octanoic acid run in over 35 minutes. Ten minutes later, the pH was raised to 11 over 10 minutes using aqueous ammonia solution and the granules so formed stirred a further 5 minutes prior to discharge onto a 60 mesh sieve. After washing with warm water, and drying at 55°-60° C., there were obtained 13.8 parts of granules having an average particle diameter of 1.2 mm. Fines amounting to 0.72 parts were recovered from the filtrate.

When tested in the decorative paint system of Example 1 the granular product of this Example was 15% stronger, very green and very transparent relative to a similar paint prepared from the same weight of C.I. Pigment Yellow 1.

EXAMPLE 3

The method of Example 2 was repeated with the use of 0.1 part hydroxy ethyl cellulose and 10 parts of the red pigment powder of formula

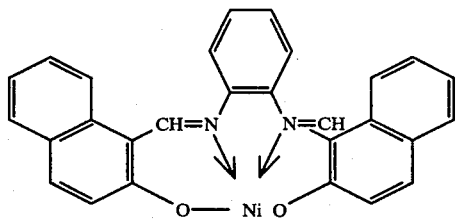

described and claimed in U.S. Pat. No. 3,864,371.

15 parts by volume of octanoic acid were required for granule formation and 30 parts of 20% aqueous sodium hydroxide solution used for acid removal. Filtration on a 100 mesh sieve yielded after drying, 8.89 parts of spherical granules of average diameter 0.8 mm.

The product of this example, was incorporated in a glycerol coconut oil alkyd resin solution in a xylene/butanol solvent blend by ballmilling and subsequently reduced to 5.9% pigmentation at 1:6.6 pigment:binder by the addition of an unmodified iso-butylated melamineformaldehyde (M/F) resin. The flow of this dispersion was superior to that of a similar dispersion prepared using the starting pigment powder of this Example. Red tint alkyd-M/F paints were prepared from these dispersions by admixture with white alkyd-M/F paint and stoving. The pant derived from the granular product of this Example was 5-10% stronger, slightly cleaner and more blue than that derived from pigment powder.

EXAMPLE 4

Example 3 was repeated using C.I. Pigment Yellow 129 in presscake form. 25 parts octanoic acid were used for granule formation and 50 parts of sodium hydroxide solution for acid recovery. The total pigment yield was 9.6 parts, of which 0.5 part was granules greater than 1 mm average diameter, 8.2 parts were granules retained by a 100 mesh sieve but less than 1 mm average diameter, and 0.9 part was fines recovered from the filtrate.

Alkyd-M/F paint panels prepared from the granular product of this Example and a powder sample of the C.I. Pigment Yellow 129 starting material by the method of Example 3 were of similar strength and shade, but the paint prepared from granule was derived from a very much more fluid millbase.

EXAMPLES 5-13

Granules were prepared according to the following general method: 10 parts pigment, in powder (Pdr) or presscake (P/C) form, were stirred in cold water containing hydroxy ethyl cellulose (Natrosol brand: Hercules Powder Co.) until a dispersion was formed. With moderate propeller or paddle agitation, the temperature was raised and a volume of octanoic acid slowly added. When granule formation was complete, alkali was added over 10 minutes to raise the pH to 11. After further 5 minutes, stirring was discontinued and the granules isolated on a 100 mesh sieve, washed salt free and to neutral pH with warm water, and dried at 50° C. Fine granular or powder particles passing through the sieve were recovered from the filtrate.

Experimental details and the results of application tests in lithographic ink medium, in each case relative to the corresponding powder pigment, are contained in Table I.

TABLE I

| Ex. No. | C.I. Pigment No. | Pigment Form | Stabilising Colloid Type & Amount | Temp. (°C.) | Octanoic Acid Amount & Time of Addition | Alkali Type | Granules Yield & Av. Diam. | Fines Yield | Application Properties in Litho Ink. |
|---|---|---|---|---|---|---|---|---|---|
| 5 | Blue 15.3 | Pdr. | 0.075 pts/250HR | 70 | 9.75 pts/ 60 mins. | NH₃ | 9.88pts 2.1 mm | 0.06 pts | Similar strength, clean, v. green |
| 6 | Green 7 | P/C | 0.05 pts/250HR | 70 | 10 pts/ 45 mins. | NH₃ | 9.92pts/ 1.8 mm | 0.02 pts | Equal strength, sl. cleaner |
| 7 | Red 166 | Pdr. | 0.05 pts/250HR | 65 | 10 pts/ 25 mins. | Na₂CO₃ | 8.43pts/ 1.2 mm | 1.45 pts | Identical |
| 8 | Yellow 93 | P/C | 0.10 pts/250HR | 55 | 10 pts/ 40 mins. | NH₃ | 9.09pts/ 1.0 mm | 0.72 pts | Equal strength, sl. more opaque, sl. clean and green |
| 9 | Violet 37 | Pdr. | 0.045 pts/250LR | 75 | 7.5 pts/ 20 mins. | NH₃ | 9.85pts/ 1.5 mm | 0.14 pts | sl. weaker, sl. more opaque |
| 10 | Red 216 | Pdr. | 0.075 pts/250HR | 60 | 8.9 pts/ 20 mins. | NH₃ | 9.61pts/ 1.7 mm | 0.36 pts | Identical. |
| 11 | Red 4 | Pdr. | 0.65 pts/250HR | 65 | 10 pts/ 45 mins. | NH₃ | 8.70pts/ 0.9 mm | 1.11 pts | Identical. |

TABLE I-continued

| Ex. No. | C.I. Pigment No. | Pigment Form | Stabilising Colloid Type & Amount | Temp. (°C.) | Octanoic Acid Amount & Time of Addition | Alkali Type | Granules Yield & Av. Diam. | Fines Yield | Application Properties in Litho Ink. |
|---|---|---|---|---|---|---|---|---|---|
| 12 | Orange 5 | Pdr. | 0.05 pts/250MR | 65 | 8.6 pts/ 40 mins. | NaOH | 8.18pts/ 0.7 mm | 1.69 pts | V. sl. strong. |
| 13 | Yellow 74 | Pdr. | 0.065 pts/250HR | 65 | 8.3 pts/ 25 mins. | $NH_3$ | 9.54pts/ 1.3 mm | 0.27 pts | Identical. |

EXAMPLE 14

87 parts of crude copper phthalocyanine were ground in a ball mill with 13 parts phthalimide until the phthalocyanine was in pigmentary form.

34.4 parts of this mixture were stirred in 1250 parts water containing 0.3 parts hydroxy ethyl cellulose (Natrosol 250HR) until a dispersion was obtained. With paddle stirring, the temperature was raised to 65° C. and a heated solution of 1.65 parts Rosin Amine D (dehydroabiethylamine) and 1.69 parts Staybelite Resin (hydrogenated wood rosin) in 40 parts by volume of octanoic acid added over 40 minutes. After stirring for a further 10 minutes, the pH was raised to 11 with aqueous sodium hydroxide solution. Ten minutes later the stirring was discontinued and the granular product separated and recovered. There were obtained 27.2 parts of granules of average diameter 1.8 mm. 2.5 parts of fines were recovered from the filtrate.

When tested in a lithographic ink system, the granular product of this Example was of similar strength but considerably cleaner and greener than a pigment powder derived from the same copper phthalocyanine starting material.

EXAMPLE 15

20 parts of C.I. Pigment Yellow 83 in presscake form were dispersed in 500 parts water containing 0.2 parts hydroxy ethyl cellulose (Natrosol 250HR). With propeller stirring, the temperature was raised to 65° C. and 25 parts by volume octanoic acid added over 30 minutes. The temperature was increased to 98° C., maintained for 1 hour, then reduced to 65° C., stirring throughout. The granules thus formed were separated from the octanoic acid by discharge into a stirring mixture of 50 parts of 5 M sodium hydroxide solution in 2000 parts water. After stirring for a further 30 minutes, the granules were recovered on a 60 mesh sieve, washed to neutral pH and dried at 55°–60° C. There were obtained 19.4 parts of granules of 0.5 mm average particle diameter.

When tested in a lithographic ink system, the pigment granules of this Example were of the same strength but cleaner than the starting pigment in powder form.

EXAMPLE 16

10 parts of C.I. Pigment Orange 34, in presscake form were dispersed in 500 parts water at 50° C. 0.1 part hydroxy ethyl cellulose (Natrosol 250HR) were added and the temperature increased to 65° C. With propeller stirring, 18 parts by volume of octanoic acid were added over 20 minutes. Stirring was maintained for 10 minutes and subsequently during the addition of 20 parts sodium chloride and, 10 minutes later, 36 parts of 20% aqueous sodium hydroxide solution. The pigment granules were recovered using a 100 mesh sieve as previously described. The yield was 9.72 parts of essentially spherical granules of 1.0 mm average diameter, with 0.11 part fines recovered from the filtrate.

When assessed in lithographic ink the granular product of this Example was of similar strength but slightly cleaner and more opaque than a similar ink prepared from the starting pigment in powder form.

EXAMPLE 17

An aqueous slurry of C.I. Pigment Yellow 17 containing 10 parts pigment was diluted to 500 parts by volume with water. 0.1 part hydroxy ethyl cellulose (Natrosol 250HR) was added and the temperature raised to 65° C. With paddle stirring 13 parts by volume of 2-ethyl hexanoic acid were added over 45 minutes. Stirring was maintained for 25 minutes and subsequently during the addition of 26 parts of 20% aqueous sodium hydroxide solution. After stirring for a further 5 minutes, the pigment granules were recovered on a 100 mesh sieve as previously described. The yield was 8.72 parts of rounded granules of 0.9 mm average diameter.

The properties of the pigment granules of this Example when dispersed in a lithographic ink were similar to those of the starting pigment in powder form.

EXAMPLE 18

The method of Example 17 was repeated using 10 parts of C.I. Pigment Red 112. 10 parts by volume of 2-ethyl hexanoic acid were required to produce 9.39 parts of granules of 1.0 mm average

EXAMPLE 19

0.4 Parts hydroxy ethyl cellulose (Natrosol 250HR) were added to 1000 parts of a freshly coupled aqueous slurry containing 40 parts of C.I. Pigment Yellow 17. The temperature was raised to 65° C. and with paddle stirring 31.5 parts by volume of octanoic acid were added over 1 hour. Stirring was stopped, 500 parts of water decanted off, and 1000 parts fresh water at 65° C. added. After 5 minutes stirring, a further 1000 parts of water were decanted off and replaced by 1000 parts fresh water. The slurry was transferred to an autoclave fitted with a paddle stirrer. The temperature was raised to 150° C. and maintained for 30 minutes. After cooling to 50° C., 80 parts of 20% aqueous sodium hydroxide solution were added and the granules so formed recovered on a 60 mesh sieve as previously described. There were obtained 35.8 parts of essentially spherical granules of 1.3 mm average particle diameter.

When dispersed in the industrial paint system of Example 3, the granular product of this Example was weaker than a similar paint derived from C.I. Pigment Yellow 17 powder, but considerably more opaque and of much improved flow and weatherfastness.

EXAMPLE 20

318 parts of an aqueous pigment slurry containing 10 parts of C.I. Pigment Red 57.1 were diluted to 1000 parts with water and 0.1 part hydroxy ethyl cellulose (Natrosol 250HR) added. With paddle stirring the temperature was raised to 85° C. and 16 parts by volume of octanoic acid added over 20 minutes. The temperature was reduced to 16° C. by the addition of ice, stirred a further 10 minutes, and the mixture discharged into a stirring solution of 30 parts of 20% aqueous sodium hydroxide solution in 2500 parts water. 9.81 parts of pigment granules of 0.9 mm average diameter were recovered on a 60 mesh sieve as hereinbefore described.

The pigment granules of this Example, when formulated as a lithographic ink, produced very clean, glossy prints of similar strength but of a yellower shade than prints from inks incorporating the powder form of the starting pigment.

EXAMPLE 21

The method of Example 20 was repeated using 10 parts of C.I. Pigment Red. 48.4 in the form of an aqueous slurry. 25 parts by volume of octanoic acid, added to the stirring pigment slurry over 1 hour were required for granule formation. 50 parts of 20% aqueous sodium hydroxide solution were used in the recovery stage to yield 9.65 parts of essentially spherical granules of 0.8 mm average diameter.

The properties of these granules in a lithographic ink system were similar to those of the starting pigment in powder form, with the exception of a slightly yellower hue.

EXAMPLE 22

The method of Examples 5-13 was repeated using 10 parts of C.I. Pigment Red 37 in slurry form. 13 parts by volume of octanoic acid were required for granule formation and 26 parts of 20% aqueous sodium hydroxide solution for the removal of the octanoic acid. There were obtained 9.3 parts of well rounded granules of 1.0 mm average particle diameter, having similar properties to the powder form of the starting pigment in a lithographic ink system.

EXAMPLE 23

118 parts of an aqueous presscake containing 10 parts of C.I. Pigment Orange 34 were dispersed in a mixture of 0.1 part hydroxy ethyl cellulose (Natrosol 250LR) and 500 parts of water at 60° C. With paddle stirring, there were added all at once, 18 parts by volume of octanoic acid. The mixture was stirred at 90° C. for 2 hours, then cooled to 50° C. and the pH raised to 11 by the addition of aqueous sodium hydroxide solution. There were obtained 9.7 parts of irregularly shaped granules of 2.1 mm average particle diameter.

EXAMPLE 24

118 parts of aqueous presscake containing 10 parts of C.I. Pigment Orange 34, diluted to 500 parts with water, were simultaneously heated to 65° C. and dispersed by a high speed mixer/emulsifier.

In a second vessel 0.1 part hydroxy ethyl cellulose (Natrosol 250HR) was added to 200 parts water at 65° C. and paddle stirred for 5 minutes. While maintaining stirring, 18 parts by volume of octanoic acid were added, the temperature raised to 80° C. and the aqueous pigment dispersion poured in. After about 15 minutes, when granule formation was complete, 20 parts of sodium chloride were added, followed 5 minutes later by 36 parts of 20% sodium hydroxide solution. The stirrer was stopped 10 minutes later and the granules isolated on a 100 mesh sieve, washed and dried. The yield was 9.09 parts of substantially spherical granules of 0.8 mm average particle diameter.

The application properties of the granular product were similar to those of the powder form of the starting material.

EXAMPLE 25

To the pigment slurry of Example 23 there were added with propeller stirring, 28 parts by volume of hexanoic acid over 30 minutes. Aqueous sodium hydroxide solution was used to remove the acid and allow the recovery of 9.86 parts of small granules of 0.6 mm average diameter as hereinbefore described.

EXAMPLE 26

206 parts of C.I. Pigment Yellow 83 presscake containing 40 parts pigment were dispersed by high speed stirring in 700 parts water containing 0.4 parts hydroxy ethyl cellulose (Natrosol 250HR). The dispersion was transferred to an autoclave fitted with paddle stirring and heated to 65° C. 40 parts by volume of octanoic acid were added over 30 minutes and the temperature raised to 130° C. and maintained 30 minutes. After cooling to 65° C., 80 parts of 5 M sodium hydroxide solution were added over 15 minutes, the stirring continued for a further 5 minutes, and the granular product recovered on a 60 mesh sieve, washed with warm water and dried at 60° C.

The granular product of 1.0 mm average particle diameter, recovered in a yield of 36.6 parts, was incorporated in the industrial paint system of Example 3. When compared with a paint prepared from the starting pigment in powder form, the granular product of this Example was weaker but more opaque and of improved flow and weatherfastness.

EXAMPLE 27

103 parts of aqueous presscake containing 20 parts of C.I. Pigment Yellow 83 were dispersed by high speed stirring in 600 parts water containing 0.2 part hydroxy ethyl cellulose (Natrosol 250HR). 1 part of the carboxy ester compound prepared according to Example B of our British Pat. No. 10239/75 was dissolved in 25 parts warm octanoic acid and added to the stirring pigment dispersion. The temperature was raised to 98° C. and maintained for 6 hours, stirring continuously. After cooling to 50° C. the pH was raised to 10.5 by the addition of sodium hydroxide solution over 15 minutes. Stirring was continued for a further 10 minutes, and the small (0.4 mm av. diameter) granules recovered on a 100 mesh sieve, washed and dried. The yield was 18.1 parts.

When incorporated in the decorative paint system of Example 1, the granular product of this Example was of similar strength, but more opaque and of improved flow relative to the powder form of C.I. Pigment Yellow 83.

EXAMPLE 28

To the pigment dispersion of Example 23 there were added, with paddle stirring, 18 parts of volume of iso-octanoic acid (6-methyl heptanoic acid) over 40 minutes at 65° C. After a further 10 minutes 20 parts of sodium chloride were added and the temperature lowered to 50° C. The pH was raised to 11.5 by the addition of aqueous sodium hydroxide solution and the granules thus formed recovered on a 100 mesh sieve as previously described.

9.45 parts of granules of 1.0 mm average particle diameter were obtained.

EXAMPLE 29

The method of Example 28 was repeated using a dispersion derived from presscake containing 10 parts of C.I. Pigment Red 37. 9.9 parts of robust, substantially spherical granules were obtained. The average particle diameter was 1.0 mm with a particularly narrow particle size distribution.

The application properties of the granules of this Example were similar to those of the granules of Example 22 in a lithographic ink system.

EXAMPLE 30

10 parts of C.I. Pigment Yellow 83 as presscake were dispersed in 500 parts water at 20° C., 0.1 part hydroxy ethyl cellulose (Natrosol 250HR) were added and the temperature raised to 65° C. With propeller stirring, 13 parts by volume of mono-ethyl-suberate were then added over 30 minutes. Stirring was maintained for 5 minutes, then 1250 parts water and 26 parts of 20% sodium hydroxide solution were added. After stirring a further 30 minutes the pigment granules were recovered on a 100 mesh (B.S.) sieve as previously described. The yield was 9.5 parts of almost spherical granules.

EXAMPLE 31

Example 30 was repeated using 25 parts by volume of 2-ethylbutyric acid for bead formation and 50 parts of sodium hydroxide solution for acid recovery. The yield was 9.25 parts of essentially spherical granules of 1.0 mm average diameter.

EXAMPLE 32

Example 30 was repeated using 14 parts by volume of isononanoic acid for bead formation and 28 parts of sodium hydroxide solution for acid recovery. The yield was 9.6 parts of essentially spherical granules.

EXAMPLES 33 TO 52

The acids used in these Examples are set out in the following Table II. When tested in lithographic ink system, the granular products were all more opaque than the base pigment used.

The general procedure used for the preparation of Examples 33–52 is as follows:

63 parts of aqueous presscake containing 9.5 parts of C.I. Pigment Yellow 17 were stirred with 30 parts by volume of organic acid 1. The pigment flushed into the acid and the water was decanted off. 20 parts by volume of acid 1 were added and the temperature raised to 155° C. and held for 1 hour. The temperature was then reduced to 90° C., 100 parts by volume of 20% sodium hydroxide were added and the mixture filtered. The presscake was slurried with 500 parts by volume of water and 0.1 part of hydroxy ethyl cellulose (Natrosol 250HR) were added. With propeller stirring the temperature was raised to 65° C. and acid 2 added over 15 minutes. Stirring was maintained for 5 minutes, then 20% sodium hydroxide solution added. After stirring a further 10 minutes the pigment granules were isolated on a 100 mesh (B.S.) sieve as previously described.

TABLE II

| Ex. No. | Acid 1 | Acid 2 | Parts used by volume |
|---|---|---|---|
| 33 | 2-ethylhexanoic acid | 2-ethylhexanoic acid | 14 |
| 34 | " | 2-ethylbutyric acid | 26 |
| 35 | " | octanoic acid | 17 |
| 36 | " | iso-octanoic acid | 16.5 |
| 37 | " | iso-nonanoic acid | 14 |
| 38 | octanoic acid | 2-ethyl hexanoic acid | 10.5 |
| 39 | " | 2-ethyl butyric acid | 22 |
| 40 | " | octanoic acid | 12 |
| 41 | " | iso-octanoic acid | 12 |
| 42 | " | iso-nonanoic acid | 14 |
| 43 | 2-ethyl butyric acid | 2-ethyl hexanoic acid | 8 |
| 44 | " | 2-ethyl butyric acid | 20 |
| 45 | " | octanoic acid | 9.5 |
| 46 | " | iso-octanoic acid | 10 |
| 47 | " | iso-nonanoic acid | 10 |
| 48 | iso-octanoic acid | 2-ethylhexanoic acid | 14 |
| 49 | " | 3-ethyl butyric acid | 25 |
| 50 | " | octanoic acid | 11 |
| 51 | " | iso-octanoic acid | 13 |
| 52 | " | iso-nonanoic acid | 12 |

EXAMPLE 53

40 parts of C.I. Pigment Yellow 17 presscake containing 10 parts pigment were dispersed by high speed stirring in 600 parts water containing 0.1 part hydroxy ethyl cellulose (Natrosol 250HR). With paddle stirring the temperature was raised to 60°–70° C. and a mixture of 10 parts by volume of octanoic acid and 10 parts by volume of isononanoic acid added. When granule formation was complete 40 parts of 5 M sodium hydroxide solution was added over 20 minutes. The granules were isolated on a 100 mesh (B.S.) sieve, washed salt free and to neutral pH with water and dried at 60° C. The yield was 9.0 parts of essentially spherical granules.

EXAMPLE 54

The procedure of Example 53 was repeated using a mixture of 9 parts by volume of 2-ethylhexanoic acid and 9 parts by volume of 2-ethylbutyric acid giving 9.5 parts of essentially spherical granules.

EXAMPLE 55

The procedure of Example 53 was repeated using a mixture of 12 parts by volume of isooctanoic acid and 6 parts by volume of isononanoic acid, giving 9.7 parts of essentially spherical granules.

EXAMPLE 56

30 parts of C.I. Pigment Yellow 83 as prepared by a conventional aqueous coupling was heated to 67°–70° C. with stirring and 87 parts by volume 2-ethylhexanoic acid was added over 45 minutes. Stirring was maintained for 30 minutes then 20% sodium hydroxide solution was added to bring the pH to 7.0–8.0. After stirring a further 60 minutes the pigment granules were recovered by filtration on a 60 mesh (B.S.) sieve, washed with water free of inorganic salts and dried at 50° C. The yield was 27.7 parts of essentially spherical granules.

EXAMPLE 57

Example 56 was repeated using 30 parts C.I. Pigment Orange 34 and 86 parts by volume 2-ethyl hexanoic acid. The yield was 28.6 parts of essentially spherical granules.

EXAMPLE 58

To 90 parts C.I. Pigment Red 48.2 as prepared by a conventional aqueous azo coupling and before laking was added a solution of 10 parts of Staybelite resin as its potassium salt and the mixture stirred and heated to 45° C. The pH was then lowered to 7.5 by adding 2 N hydrochloric acid and thereafter 5 parts dicyclohexyl phthalate dissolved in 100 parts by volume of 2-ethyl hexanoic acid added followed by 47 parts calcium chloride dihydrate. The mixture was stirred and heated to 80° C. The pH was then lowered to 4.4–4.5 by adding 2 N hydrochloric acid and stirred at 80° C. for 30 minutes until the pH fell to 3.0. The pH was then raised to 6.5–7.0 by adding 20% sodium hydroxide solution. The mixture was stirred 30 minutes at pH 6.5–7.0 and the resulting granules were recovered by filtration on a 60 mesh (B.S.) sieve, washed with water to remove inorganic salts and dried at 45° C. The yield was 87 parts of essentially rounded granules average size 1.0 mm. The properties of the pigment granules of this Example when dispersed in a lithographic ink were similar to those of the starting pigment in powder form.

EXAMPLE 59

To 100 parts of a dyestuff treated C.I. Pigment Yellow 13 as prepared by a conventional aqueous azo coupling was added 0.5 parts hydroxy ethyl cellulose (Natrosol 250HR). The mixture was stirred and heated at 40° C. and then 5 parts dicyclohexyl phthalate (Howflex CP) dissolved in 100 parts by volume of 2-ethyl hexanoic acid added. The mixture was then stirred for 30 minutes. The pH was then raised to 6.5–7.0 by adding 20% sodium hydroxide solution. The mixture was then stirred for 30 minutes at pH 6.5–7.0 and the resulting granules were recovered by filtration on a 60 mesh (B.S.) sieve, washed with water to remove inorganic salts and dried at 40°–50° C. The yield was 105 parts of rounded granules of 0.7 mm average diameter.

The properties of the pigment granules of this Example when dispersed in lithographic ink were similar to those of the starting pigment in powder form.

EXAMPLE 60

To 20 parts C.I. Pigment Red 57:1 as prepared by a conventional aqueous coupling was added 0.2 parts hydroxy ethyl cellulose (Natrosol 250HR). With conventional stirring it was heated to 85°–90° C. and 30 parts by volume of 2-ethyl hexanoic acid added, stirred 15 minutes. The pH was then raised to 7.3 by adding ammonia and stirred 30 minutes. The resulting granules were filtered off on a 60 mesh (B.S.) sieve, washed with water free of organic salts and dried at 40° C., then roasted at 90° C. for 3 hours.

EXAMPLE 61

85 parts of C.I. Pigment Yellow 74 presscake containing 30 parts pigment were dispersed by high speed stirring in 1500 parts water. With paddle stirring the temperature was raised to 65°–70° C. and 27.3 parts 2-ethyl hexanoic acid neutralized with 37.5 parts of 5 M sodium hydroxide solution added. 5 M hydrochloric acid was added to lower the pH to 4.0 and liberate the aliphatic acid. When granule formation was complete 5 M sodium hydroxide solution was added over 20 minutes to bring the pH to 7.0–8.0. After stirring a further 40 minutes the pigment granules were recovered by filtration on a 100 mesh (B.S.) sieve, washed with water free of inorganic salts and dried at 50° C. The yield was 29 parts of essentially spherical granules.

EXAMPLE 62

The procedure of Example 61 was repeated using potassium hydroxide to neutralise the 2-ethyl hexanoic acid. The yield was 29.7 parts of essentially spherical granules.

EXAMPLE 63

The procedure of Example 61 was repeated using ammonium hydroxide to neutralize the 2-ethyl hexanoic acid. The yield was 28.6 parts of essentially spherical granules.

EXAMPLE 64

89.7 parts of C.I. Pigment Blue 15.1 presscake containing 30 parts pigment were dispersed by high speed stirring in 1500 parts water. With paddle stirring the temperature was raised to 65°–70° C. and 50 parts of 2-ethyl hexanoic acid neutralised with 68.7 parts of 5 M sodium hydroxide solution added. 5 M hydrochloric acid was added to liberate the aliphatic acid lowering the pH to 3.5–4.0. When granule formation was complete 5 M sodium hydroxide solution was added over 20 minutes raising the pH to 7.0–8.0. After stirring a further 40 minutes the pigment granules were recovered by filtration on a 100 mesh (B.S.) sieve, washed with water free of inorganic salts and dried at 50° C. The yield was 29.4 parts of essentially spherical granules.

EXAMPLE 65

The procedure of Example 64 was repeated using potassium hydroxide to neutralize the 2-ethyl hexanoic acid. The yield was 28.2 parts of essentially spherical granules.

EXAMPLE 66

The procedure of Example 64 was repeated using ammonium hydroxide to neutralize the 2-ethyl hexanoic acid. The yield was 28.5 parts of essentially spherical granules.

EXAMPLE 67

8.97 parts C.I. Pigment Blue 15.1 presscake containing 30 parts pigment were dispersed by high speed stirring in 150 ml water at 20° C., 2.6 parts carboxymethyl cellulose (Cellotas B300) were added and the temperature raised to 65°–70° C., with paddle stirring. 50 parts of 2-ethyl hexanoic acid neutralized with 68.7 parts by volume of 5 M sodium hydroxide solution added. The aliphatic acid was then liberated by the addition of 5 M hydrochloric acid lowering the pH to 3.5–4.0. When granule formation was complete 5 M sodium hydroxide solution was added over 20 minutes raising the pH to 7.0–8.0. After stirring a further 40 minutes the pigment granules were recovered by filtration on a 100 mesh (B.S.) sieve, washed with water free of inorganic salts and dried at 50° C. The yield was 27.1 parts of essentially spherical granules.

EXAMPLE 68

The procedure of Example 67 was repeated using 0.3 parts polyvinyl alcohol (Moviol 4-88). The yield was 26.6 parts of essentially spherical granules.

EXAMPLE 69

The procedure of Example 67 was repeated using 1.5 parts di-octyl sulphosuccinate (Alcopol O). The yield was 20.8 parts of essentially spherical granules.

EXAMPLE 70

114 parts of C.I. Pigments Orange 34 presscake containing 30 parts pigment were dispersed by high speed stirring in 1500 parts water, 0.3 parts carboxymethyl cellulose (Cellofas B300) were added and with paddle stirring the temperature was raised to 65°–70° C.

60 parts of 2-ethyl hexanoic acid neutralized with 83 parts by volume of 5 M sodium hydroxide solution added. The aliphatic acid was liberated by lowering the pH to 2–3 by the addition of 5 M hydrochloric acid. When granule formation was complete, 30% w/w ammonia solution was added over 20 minutes raising the pH to 6.0–8.0. After stirring a further 40 minutes the pigment granules were recovered by filtration on a 100 mesh (B.S.) sieve, washed with water free of inorganic salts and dried at 50° C. The yield was 28.8 parts of pigmented granules.

EXAMPLE 71

To 105 parts C.I. Pigment Red 48.2 as prepared by a conventional aqueous azo coupling and laking heated to 80° C. was added a solution of 10 parts Staybelite resin and 5 parts α methylstyrene derivative (Kristalex F100) dissolved in 150 parts by volume of 2-ethyl hexanoic acid and the mixture stirred for 30 minutes, then a further 50 parts by volume of 2-ethyl hexanoic acid was added. When granule formation was complete the pH was raised to 6.5–7.0 by adding 20% sodium hydroxide solution. The mixture was stirred 30 minutes at pH 6.5–7.0 and the resulting granules were recovered by filtration on a 60 mesh (B.S.) sieve, washed with water to remove inorganic salts and dried at 50° C. then roasted for 2 hours at 90° C. The yield was 116 parts of essentially granular material.

EXAMPLE 72

To 20 parts of C.I. Pigment Red 57.1 as prepared by a conventional aqueous coupling and laking was added 0.02 parts hydroxy ethyl cellulose (Natrosol 250HR). With conventional stirring it was heated to 40°–50° C. and 42 parts of volume of 2-ethyl hexanoic acid added, stirred 15 minutes. The pH was then raised to 9.0 over 30 minutes by adding 30% w/w ammonia solution. The resulting granules were filtered off on a 100 mesh (B.S.) sieve, washed with water free of insoluble salts and dried at 40° C. then roasted at 90° C. for 3 hours. The yield was 19 parts of essentially spherical granules.

EXAMPLE 73

To 20 parts of C.I. Pigment Red 57.1 as prepared by a conventional aqueous coupling was added 0.02 parts hydroxy ethyl cellulose (Natrosol 250HR). With conventional stirring it was heated to 40° C. and 50 parts by volume of 2-ethyl hexanoic acid was added and stirred for 15 minutes. The pH was then raised to 9 by adding 56 parts by volume ammonia solution over 10 minutes. The resulting granules were filtered off on a 100 mesh (B.S.) sieve, and washed with water until free of inorganic salts. The granules were then dried at 40° C. and roasted at 90° C. for 2 hours. The yield was 20 parts of essentially spherical granules.

EXAMPLE 74

85 parts of C.I. Pigment Yellow 74 presscake containing 30 parts of pigment were dispersed by high speed stirring in 600 parts water. With paddle stirring the temperature was raised to 60°–65° C. and 18 parts of 2-ethyl hexanoic acid added over 10 minutes. The pH was then raised to 6.5–7.0 by adding 30% w/w ammonia hydroxide solution. Thereafter, the pH is reduced to 3.0 by adding 5 M hydrochloric acid to insolubilise the aliphatic acid. The foregoing sequential procedure of solubilising, then insolubilising the organic acid was repeated twice more. The resulting essentially spherical granules were isolated, washed and dried to yield 27.5 parts of product.

EXAMPLE 75

The procedure of Example 74 was repeated excepting that iso-octanoic acid was used instead of 2-ethyl hexanoic acid.

EXAMPLE 76

The procedure described in Example 74 was repeated with the exception that 30 parts of C.I. Pigment Red 48.2 was used instead of C.I. Pigment Yellow 74. The yield was 28.1 parts of essentially granular material.

EXAMPLE 77

50 parts of C.I. Pigment Red 57.1 presscake containing 20 parts pigment were dispersed in 500 parts water containing 0.02 parts of hydroxyethyl cellulose (trade name Matrosol 250HR) and heated to 60° C. To this stirred suspension were added 80 parts of 2-ethyl hexanoic acid and the mixture was stirred for a further 30 minutes at 60° C. The pH was adjusted to 9 with 30% w/w ammonia hydroxide solution and stirred for 1 minute. Then, using dilute acetic acid, the pH was lowered to 5 and the suspension was stirred for 5 minutes. Finally the pH was raised to 9 as before, stirred for 1 minute, then the product was isolated in the usual manner. The yield of (essentially spherical) product was 16.5 parts.

EXAMPLE 78

55 parts of C.I. Pigment Yellow 13 presscake containing 20 parts pigment were dispersed in 500 parts water containing 0.1 part hydroxyethyl cellulose (trade name Natrosol 250HR) and heated to 60° C. To this stirred suspension were added 15 parts of 2-ethyl hexanoic acid and the mixture was stirred for a further 15 minutes at 65° C. The pH was then altered to 10.5 using 10% w/w sodium hydroxide solution and the mixture was stirred for 1 minute. The pH of the mixture was adjusted to 4.5 using hydrochloric acid solution and the whole now stirred for 15 minutes, the pH of the mixture was then adjusted to 10 for 1 minute, to pH 4.7 for 5 minutes and finally to pH 10 for 1 minute and the product was isolated in the usual manner. The yield was 10.0 parts of essentially granular product.

What we claim is:

1. A process for producing a pigment or dyestuff composition in the form of dustless readily dispersible granules, which process comprises contacting, with agitation, an aqueous dispersion of a pigment and a composition comprising one or more organic acids which are liquid at temperatures below 100° C. or their salts, at a pH value at which the acid is insoluble in water, the temperature being maintained during contacting above the melting point of the acid until the pigment has completely transferred into the organic phase; increasing the pH to a value suitable to render the acid soluble in water and recovering the resulting granules.

2. A process as claimed in claim 1 wherein the acid is a $C_6$–$C_{10}$ straight- or branched-chain aliphatic carboxylic acid.

3. A process as claimed in claim 1 wherein the acid is used as an alkali metal salt or an ammonium salt.

4. A process as claimed in claim 1 wherein the amount of acid or salt is from 0.1 to 4 parts by weight percent of pigment.

5. A process as claimed in claim 4 wherein the amount of acid or salt is from 0.5 to 1.5 parts by weight per part of pigment.

6. A process as claimed in claim 1 wherein an organic carrier is present, which is soluble in, or at least softened by, the acid compound; and which is insoluble, or can be rendered insoluble in water, at the final pH value used in the process.

7. A process as claimed in claim 6 wherein the carrier has a melting point above 40° C. and the ratio of pigment to additive is from 90:10 to 100:0.

8. A process as claimed in claim 6 wherein the carrier is a carboxylic acid ester derived from alkyl, aryl, aralkyl or cycloalkyl carboxylic acids or polyacids, with alkyl, aryl, aralkyl or cycloalkyl mono- or polyhydroxy compounds; amides from these acids with ammonia, or alkyl, aryl, aralkyl or cycloalkyl mono- or polyamines; phosphate esters; resins; vinyl polymers or copolymers; acrylate or methacrylate polymers and copolymers; polyvinyl acetate or vinyl acetate copolymers; styrene homo- or copolymers; polyolefins; or fatty alcohols.

9. A process as claimed in claim 1 wherein a protective colloid is added to the mixture to assist in the formation of granules and in the production of granules of a more uniform size distribution.

10. A process as claimed in claim 9 wherein the protective colloid is a hydroxyethyl cellulose.

* * * * *